Patented Oct. 23, 1951

2,572,701

UNITED STATES PATENT OFFICE 2,572,701

PREPARATION OF CUMENE

Ben Bennett Corson and Walter Monroe Kutz, Pittsburgh, Pa., assignors, by mesne assignments, to Koppers Company, Inc., a corporation of Delaware No Drawing. Application September 20, 1943, Serial No. 503,112

4 Claims. (Cl. 260—671)

The present invention relates to the alkylation of aromatic hydrocarbons with such normally-gaseous olefin as propylene; it is more particularly concerned with improvements in the manufacture of cumene (monoisopropylbenzene).

Cumene has more recently achieved a place of importance as a commodity in the trade because of the desirable results it produces when incorporated in aviation fuels wherein its high antiknock value has shown it to be a superior product for adding importantly to the power output of airplane motors. Concentrated sulphuric acid (i. e. 66° Bé., and even stronger) has long been known as an effective reagent for promoting the condensation of propylene, with aromatic hydrocarbons such as benzene, toluene, naphthalene, etc. to give alkylated aromatic hydrocarbons.

An object of the present invention is the provision of improvements in the employment of sulphuric acid for the condensation of propylene with benzene to form cumene and whereby the disadvantageous lower temperatures taught for the purpose by the prior art can be effectively and advantageously dispensed with.

A further object of invention is improvements whereby benzene can be condensed with propylene to provide increased molar yields of cumene per mole of employed sulphuric-acid catalyst.

A further object of invention is improvements, for the stated purpose, whereby sulphuric acid can be employed to form cumene with greater economy of both propylene and benzene.

The invention has for further objects such other improvements and such other operative advantages or results as may be found to obtain in the processes or apparatus hereinafter described or claimed.

The present inventors have now determined that if benzene is alkylated with propylene in the presence of sulphuric acid as the catalyst, it is highly advantageous, if cumene is the preferred reaction product, to perform said alkylation at temperatures above about 25° C. and preferably at, or above, about 65° C. In general, with increasing temperature, there is produced, per mole of employed sulphuric acid, not only a higher molar yield of cumene than obtains at lower temperatures but there also results an important increase in the ratio, by weight, of cumene to the polypropylated benzenes simultaneously also formed by said reaction. All of which contributes to economy in the production of the preferred said cumene product. The instant inventors have further determined that additional advantage also results in the performance of said alkylation reaction, to prepare the preferred said product, if at the said elevated temperatures of invention, sulphuric acids having concentrations less than 93 to 98% by weight of sulphuric acid are employed for the purpose; that is, it is highly desirable as the temperature of reaction is increased, correspondingly to decrease the concentration of employed sulphuric acid, as will be apparent from the hereinafter given results obtained in the practice of the present improvement.

According to the present invention, therefore, in the alkylation of benzene with propylene to form cumene, benzene and propylene are condensed with each other in the presence of sulphuric acid at temperatures above about 25° C., and preferably at, or above about 65° C., the molecular ratio of benzene to propylene in contact with the employed sulphuric acid at any one time being preferably greater than 1:1. The reaction can be performed in a relatively simple reaction-vessel that is preferably adapted to retain the heavier sulphuric-acid catalyst therein while the said reactants are continuously flowed into and out of contact with the said liquid catalyst; the reaction vessel is thus also provided with means for introducing said reactants into the reaction vessel and for flowing reaction-products and unconverted reactants therefrom and for returning the latter for retreatment into the aforesaid means for introducing reactants into said vessel. A device, such as a decanter settling-basin adapted automatically to remove entrained acid catalyst from reaction-products that issue from the reaction-vessel and to return thereto so-separated acid, is also of importance.

The alkylation reaction can be carried out at atmospheric or superatmospheric pressures and, in those instances where the former condition obtains and the chosen reaction temperature is sufficiently high that there is extensive vaporization of the reactant, benzene, condenser means are provided to recover the same so that it can be returned to the zone of alkylation. The reaction vessel is also preferably provided with an internally-disposed agitator device for establishing intimate contact between the said catalyst and reactants.

The reaction-products issuing from the reaction zone comprise unreacted benzene and a relatively small proportion of propylene in admixture with the formed cumene and any polypropylated benzene. The said reaction-products can, if preferred and a cyclic system of apparatus is provided, be continuously flowed into a fractional distillation column wherein the unreacted benzene and propylene are removed as "over-head" whence they are immediately recycled to the zone of catalysis in admixture with additional said reactants employed as "make-up," and the formed cumene and the polypropylated benzenes can be removed from said column at different lower levels thereof in substantially pure form.

In the practice of the present improvement in its preferred form, benzene and propylene are reacted in the molar ratio respectively of at least about 4:1 at temperatures between about 65° and 80° C. in the presence of sulphuric acid containing less than about 90% by weight of said acid and for sufficient time to convert the major proportion of the propylene component of said mixture to cumene during one contacting of the mixed reactants with such acid. No difficulty is experienced in maintaining these less concentrated sulphuric-acid catalysts at their employed concentrations; it might be anticipated that they would tend to lose water at the higher operating temperatures but experience has shown that such is not the case and that they automatically retain substantially their originally established concentration throughout their effective active life periods.

It is not desired to limit the present improvement to the preferred operating conditions stated immediately above because, at somewhat lower temperatures and at somewhat higher concentrations of sulphuric acid, benefits of the present improvement are realizable to an important extent as will be appreciated from the following tabulated examples of results obtained in the practice and the accompanying comments thereon.

In apparatus substantially as hereinabove described, and while maintaining all other operating conditions substantially uniform with the exception of the reaction-temperature, benzene and propylene in the molar ratio of about 4:1 were in admixture continuously flowed into and out of contact with a quantity of 96% by weight sulphuric acid that was substantially completely retained in the reaction vessel during the entire operating period, the said reactants and acid being continuously agitated throughout their time of contact. The employed weight of said acid was about 2.2 times the weight of benzene-propylene admixture hourly passed into contact therewith. Operation was continued for a period of 36 hours with substantially atmospheric pressure obtaining in the reaction-vessel. The thereby-formed cumene and poly-isopropylbenzenes were separated by fractional distillation from the reaction-products removed from the acid catalyst and the following results were obtained.

Table No. 1
[96% $H_2SO_4$.]

| Reaction Temperature, °C. | Moles of Cumene per Mole Acid | Multiple Wt. of Cumene to Poly-isopropylbenzenes | Average Conversion per Pass of Propylene |
|---|---|---|---|
| 20 | 2.4 | 5.7 | Per cent 65 |
| 40 | 3.0 | 8 | 79 |
| 65 | 3.9 | 8 | 96 |

The process of invention was repeated under substantially the above-described conditions with the exception that the employed sulphuric acid was reduced in strength from 96% to 91% by weight of $H_2SO_4$ with the results set forth in the following Table No. 2.

Table No. 2
[91% $H_2SO_4$.]

| Reaction Temperature, °C. | Moles of Cumene per Mole Acid | Multiple Wt. of Cumene to Poly-isopropylbenzenes | Average Conversion per Pass of Propylene |
|---|---|---|---|
| 40 | 3.4 | 11 | Per cent 80 |
| 65 | 3.1 | 10.5 | 73 |

With sulphuric acid of 87% by weight of $H_2SO_4$ the following result was obtained at the stated temperature.

Table No. 3
[87% $H_2SO_4$.]

| Reaction Temperature, °C. | Moles of Cumene per Mole Acid | Multiple Wt. of Cumene to Poly-isopropylbenzenes | Average Conversion per Pass of Propylene |
|---|---|---|---|
| 65 | 4.1 | 10.7 | Per cent 89 |

When the employed sulphuric acid was still further reduced in strength to 80% by weight of $H_2SO_4$ and the process repeated as above-described, the results indicated in Table No. 4 were obtained.

Table No. 4
[80% $H_2SO_4$.]

| Reaction Temperature, °C. | Moles of Cumene per Mole Acid | Multiple Wt. of Cumene to Poly-isopropylbenzenes | Average Conversion per Pass of Propylene |
|---|---|---|---|
| 65 | 3.3 | 11.5 | Per cent 63 |
| 80 | 4.0 | 14 | 76 |

Inspection of the above tables clearly shows that in the condensation of propylene with benzene by means of sulphuric acid to form cumene, it is importantly advantageous when employing 96% $H_2SO_4$ for the purpose to effect the condensation at higher temperatures than heretofore utilized because with increasing temperature there results an increased conversion of propylene per pass over the catalyst and a larger proportion thereof is converted into the wanted cumene rather than into the unwanted homologues thereof; in addition, more cumene is produced for a given quantity of the employed acid. For example, at 65° C. there is produced 1.62 times as much cumene per mole of employed said acid as when operating, under otherwise the same conditions, at 20° C.

The present inventors have also shown, in the above-tabulated data, that concentrations of sulphuric acid of less than 96% by weight of $H_2SO_4$ are useful for the instant purpose and that certain advantages accrue from employment of such acids of reduced concentration. These latter acids tend to be less vigorous catalysts at corresponding temperatures than do the said stronger acid and thus require more elevated temperatures for their similar effective use but despite this requirement they have a definite utility for achieving the objects of the invention, and as is also shown by further reference to the above tables, it is clearly apparent that when there is chosen, within that range of reaction temperatures and of effective concentrations of sulphuric acid provided by the invention, those specific operating conditions that give substantially the same molar yield of cumene per mole of employed $H_2SO_4$, the acids of lower concentrations yield the higher ratios of wanted cumene to unwanted poly-isopropylbenzene in the reaction products. For example, sulphuric acid of concentrations of 96%, 87%, and 80% by weight when employed for the purpose at respectively 65°, 65°, and 80° C. give approximately the same molar yield of cumene per mole of $H_2SO_4$ employed, but the relative proportion of cumene to poly-isopropylbenzenes in the reaction-products is respectively of the order of 8, 10.7, and 14. In other words, the more highly concentrated the effective sulphuric acid that is employed as the catalyst, the more wasteful it is of reactants for the present purpose.

In those instances, where the employed sulphuric acid is of such relatively weak concentration that temperatures above the boiling point of benzene are required for its effective use, the alkylation reaction can be successfully carried on under superatmospheric pressure. For instance, benzene has been alkylated under pressure with propylene to give cumene at 150° C. with sulphuric acid that was only 50% by weight of $H_2SO_4$.

The invention as hereinabove set forth is embodied in particular form and manner but may be variously embodied within the scope of the claims hereinafter made.

We claim:

1. An improved process for condensing propylene with benzene to form predominantly cumene, said process comprising the steps of: continuously flowing an admixture comprising benzene and propylene in the molar ratio respectively of 4:1 into contact with a relatively confined body of aqueous sulphuric acid that contains between 80% to 96% of said acid and is maintained at a temperature of between 20° to 80° C. and thereby forming cumene; maintaining the admixture and acid in continuous flow while in contact with each other in the presence of the so-formed cumene while continuously introducing additional said benzene-propylene admixture into contact therewith; and so correlating the weight of said admixture in contact with the acid with the weight of acid in said body thereof that said admixture and said acid are in contact with each other at the hourly rate of 1:2.2 parts by weight respectively; and recovering the cumene produced.

2. An improved process for condensing propylene with benzene to form predominantly cumene, said process comprising the steps of: continuously flowing an admixture comprising benzene and propylene in the molar ratio respectively of 4:1 into contact with a relatively confined body of aqueous sulphuric acid that contains 80% to 96% of said acid and is maintained at a temperature of between 20° to 80° C. and thereby forming cumene; maintaining the admixture and acid in continuous flow while in contact with each other in the presence of the so-formed cumene while continuously introducing additional said propylene-benzene admixture into contact with said acid; so correlating the weight of said admixture in contact with the acid with the weight of acid in said body thereof that said admixture and said acid are in contact with each other at the hourly rate of 1:2.2 parts by weight respectively; recovering the cumene produced; and continuing the contact of said acid body with admixture in the manner aforesaid for thirty-six hours.

3. An improved process for condensing propylene with benzene to form isopropylbenzene, said process comprising the steps of: flowing an admixture of benzene and propylene into contact with aqueous sulphuric acid that contains between 80% to 96% of said acid and is maintained at a temperature of between 20° to 80° C. and thereby forming isopropylbenzene; correlating the weight of said admixture in contact with the acid with the weight of the employed acid to maintain an hourly rate of contact therebetween of at least about twice as much acid, by weight, as the weight of the admixture of benzene and propylene, and substantially one part by weight of propylene in said admixture with eighteen parts by weight of said acid; and removing so-formed isopropylbenzene from contact with said acid.

4. In a process for preparing isopropylbenzene from a mixture of propylene and benzene by treating said mixture at a temperature between 20° C. to 80° C. with aqueous sulphuric acid containing between 80% to 96% of said acid, the improvement comprising, bringing said mixture and said acid into contact at the hourly rate of at least about twice as much acid, by weight, as the weight of the admixture of benzene and propylene, and substantially one part by weight of propylene of said mixture to eighteen parts by weight of said acid.

BEN BENNETT CORSON.
WALTER MONROE KUTZ.

REFERENCES CITED

The following references are of record in the file of this patent:

UNITED STATES PATENTS

| Number | Name | Date |
|---|---|---|
| 2,143,493 | Stanley et al. | Jan. 10, 1939 |
| 2,396,144 | Anderson et al. | Mar. 5, 1945 |

OTHER REFERENCES

Newton Jour. Am. Chem. Soc., vol. 65, 320–323 (1943).

Ipatieff et al., Jour. Am. Chem. Soc., vol. 58, 919–922 (1936).

Wunderly et al., Jour. Am. Chem. Soc., vol. 58, 1007–9 (1936).